(12) United States Patent
Coleman

(10) Patent No.: US 10,427,478 B2
(45) Date of Patent: Oct. 1, 2019

(54) TOW BALL ADAPTOR

(71) Applicant: Robert Coleman, Lewiston, NY (US)

(72) Inventor: Robert Coleman, Lewiston, NY (US)

( * ) Notice: Subject to any disclaimer, the term of this patent is extended or adjusted under 35 U.S.C. 154(b) by 147 days.

(21) Appl. No.: 15/628,286

(22) Filed: Jun. 20, 2017

(65) Prior Publication Data

US 2018/0361808 A1    Dec. 20, 2018

(51) Int. Cl.
| | |
|---|---|
| *B60D 1/02* | (2006.01) |
| *B60D 1/06* | (2006.01) |
| *B60D 1/07* | (2006.01) |
| *B60D 1/14* | (2006.01) |
| *B60D 1/00* | (2006.01) |

(52) U.S. Cl.
CPC ............. *B60D 1/06* (2013.01); *B60D 1/02* (2013.01); *B60D 1/075* (2013.01); *B60D 1/143* (2013.01); *B60D 2001/008* (2013.01)

(58) Field of Classification Search
CPC . B60D 1/00; B60D 1/06; B60D 1/065; B60D 1/07; B60D 1/075; B60D 1/14; B60D 1/143; B60D 1/145; B60D 1/28
See application file for complete search history.

(56) References Cited

U.S. PATENT DOCUMENTS

| | | | | |
|---|---|---|---|---|
| 2,078,851 A | * | 4/1937 | Smith ................... | B60D 1/065 280/513 |
| 2,510,677 A | * | 6/1950 | Blue ..................... | B60D 1/065 280/513 |
| 2,687,899 A | * | 8/1954 | Bendtsen ............. | A01B 59/042 278/96 |
| 2,691,932 A | | 10/1954 | Sawyer | |
| 2,920,907 A | | 1/1960 | Bremer | |
| 3,159,368 A | * | 12/1964 | Ahlbin ................. | B66D 3/02 224/520 |
| 3,492,024 A | * | 1/1970 | Cooper ................ | B60D 1/065 280/292 |
| 3,900,214 A | * | 8/1975 | Brockelsby ........... | B66D 1/28 224/520 |
| 4,176,852 A | * | 12/1979 | Collin .................. | B60D 1/07 280/416.1 |
| 4,379,569 A | * | 4/1983 | Koch ................... | B60D 1/07 280/416.1 |
| 4,793,430 A | | 12/1988 | Stephenson et al. | |
| 4,802,686 A | * | 2/1989 | Isreal ................... | B60D 1/06 280/477 |

(Continued)

FOREIGN PATENT DOCUMENTS

WO      WO200044217      8/2000

*Primary Examiner* — Joseph M Rocca
*Assistant Examiner* — Maurice L Williams

(57) ABSTRACT

A tow ball adaptor for coupling an implement hitch to a tow ball includes a plate. A first hole in the plate is complementary to and configured to insert a tow ball that is coupled to a vehicle. A coupler is coupled to the plate and configured to couple to the tow ball to retain the tow ball in the first hole. A cutout that extends into the plate is substantially complementary to and configured to insert an implement hitch. A plurality of third holes in the plate extends linearly between the first hole and the cutout. The third holes are complementary to and positioned to selectively align with a pair of orifices that is positioned singly in an upper and a lower tongue of the implement hitch. A hitch pin is inserted through the orifices and the third hole to couple the implement hitch to the plate.

14 Claims, 4 Drawing Sheets

(56) References Cited

U.S. PATENT DOCUMENTS

| | | | | |
|---|---|---|---|---|
| 4,901,896 A * | 2/1990 | Speer | | B60R 9/06 |
| | | | | 224/520 |
| D337,292 S | 7/1993 | Carda | | |
| 5,297,407 A * | 3/1994 | Tarr | | B62D 53/085 |
| | | | | 280/507 |
| 6,193,259 B1 | 2/2001 | Rupard | | |
| 6,217,054 B1 * | 4/2001 | Klimek | | B60D 1/06 |
| | | | | 280/416.1 |
| 6,286,852 B1 * | 9/2001 | Slatten | | B60D 1/143 |
| | | | | 280/477 |
| 6,328,327 B1 * | 12/2001 | Ligouy | | A01B 59/042 |
| | | | | 280/482 |
| 6,530,249 B1 * | 3/2003 | Burkhead | | B60D 1/06 |
| | | | | 280/507 |
| 6,679,512 B1 | 1/2004 | Plessala | | |
| 7,017,935 B1 * | 3/2006 | Bonfanti | | B60D 1/065 |
| | | | | 280/491.5 |
| 7,306,275 B2 * | 12/2007 | Kalous | | B60D 1/06 |
| | | | | 296/1.07 |
| 7,425,016 B2 * | 9/2008 | Bowsher | | B60D 1/065 |
| | | | | 280/500 |
| 7,926,832 B1 * | 4/2011 | Hall | | B60D 1/065 |
| | | | | 280/417.1 |
| 8,636,297 B2 * | 1/2014 | Merten | | B60D 1/02 |
| | | | | 280/480 |
| 8,770,612 B2 | 7/2014 | Wendte et al. | | |
| 9,283,822 B1 * | 3/2016 | Krapf | | B60D 1/24 |
| 9,566,837 B1 * | 2/2017 | Marling | | B60D 1/065 |
| 9,744,820 B1 * | 8/2017 | Robins | | B60D 1/02 |
| 2007/0057485 A1 * | 3/2007 | Lones | | B60D 1/07 |
| | | | | 280/416.1 |
| 2008/0315554 A1 * | 12/2008 | Rightmire | | B60D 1/00 |
| | | | | 280/400 |
| 2009/0102160 A1 * | 4/2009 | Olson | | B60D 1/00 |
| | | | | 280/514 |
| 2010/0201100 A1 * | 8/2010 | Hill | | B60D 1/02 |
| | | | | 280/477 |
| 2015/0130163 A1 * | 5/2015 | Blunier | | B60D 1/247 |
| | | | | 280/405.1 |
| 2018/0015796 A1 * | 1/2018 | Bresky | | B60D 1/06 |

* cited by examiner

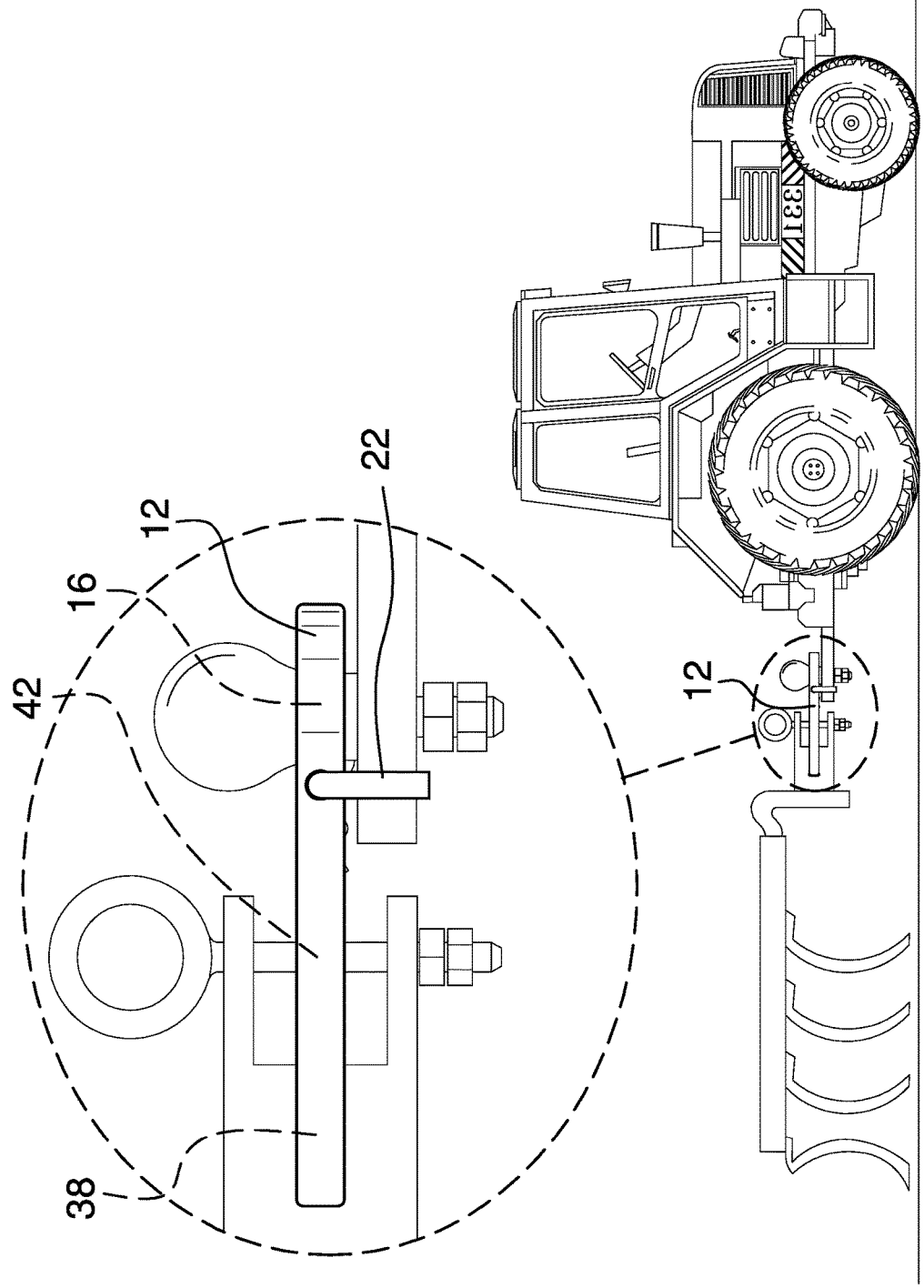

TOW BALL ADAPTOR

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to adaptors and more particularly pertains to a new adaptor for coupling an implement hitch to a tow ball.

BRIEF SUMMARY OF THE INVENTION

An embodiment of the disclosure meets the needs presented above by generally comprising a plate that is substantially rectangularly shaped. A first hole is positioned through the plate proximate to a first end of the plate. The first hole is complementary to and configured to insert a tow ball that is coupled to a vehicle, such as a tractor, all-terrain vehicle, and a lawn mower. A coupler is coupled to the plate proximate to the first hole. The coupler is configured to couple to the tow ball to retain the tow ball in the first hole. A cutout extends into the plate from a second end of the plate. The cutout is substantially complementary to and configured to insert an implement hitch. A plurality of third holes is positioned through the plate. The plurality of third holes extends linearly between the first hole and the cutout. The third holes are complementary to and positioned to selectively align with a pair of orifices that is positioned singly in upper and lower tongues of the implement hitch. A hitch pin is inserted through a respective third hole and the pair of orifices to couple the implement hitch to the plate. The implement is coupled to the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is an in-use view of an embodiment of the disclosure.

DETAILED DESCRIPTION OF THE INVENTION

Figure 1:
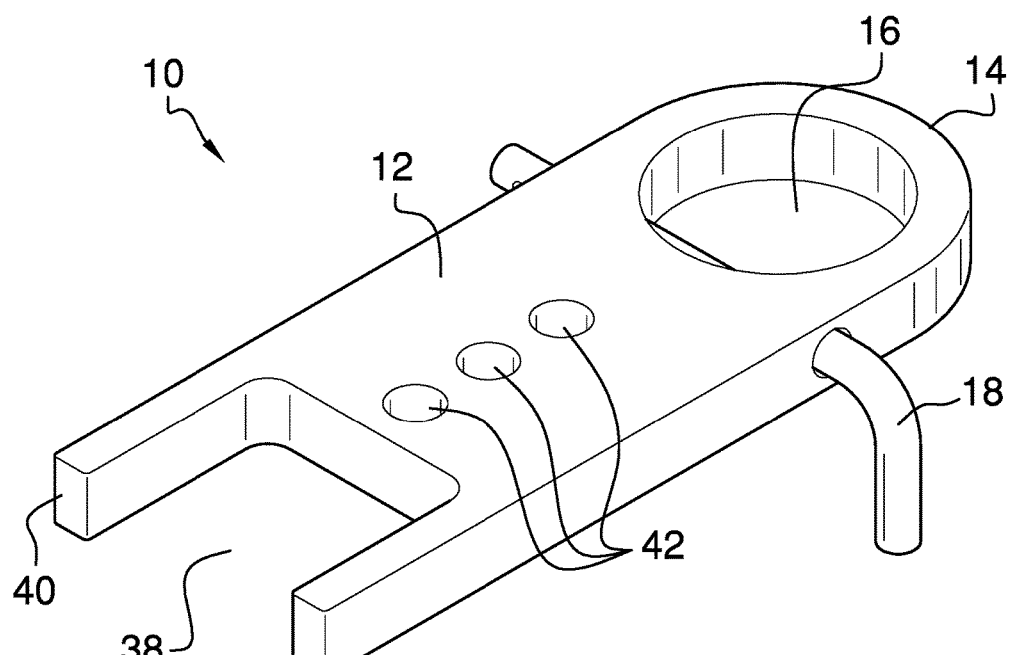
FIG. 1 is an isometric perspective view of a tow ball adaptor according to an embodiment of the disclosure.
Figure 2:
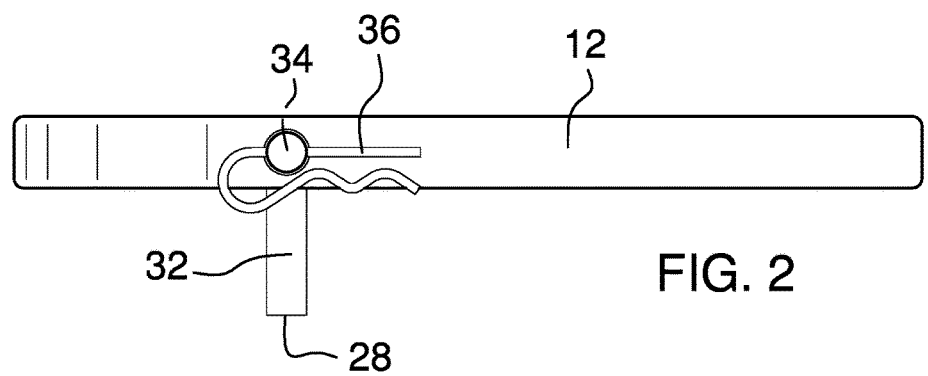
FIG. 2 is a side view of an embodiment of the disclosure.
Figure 3:
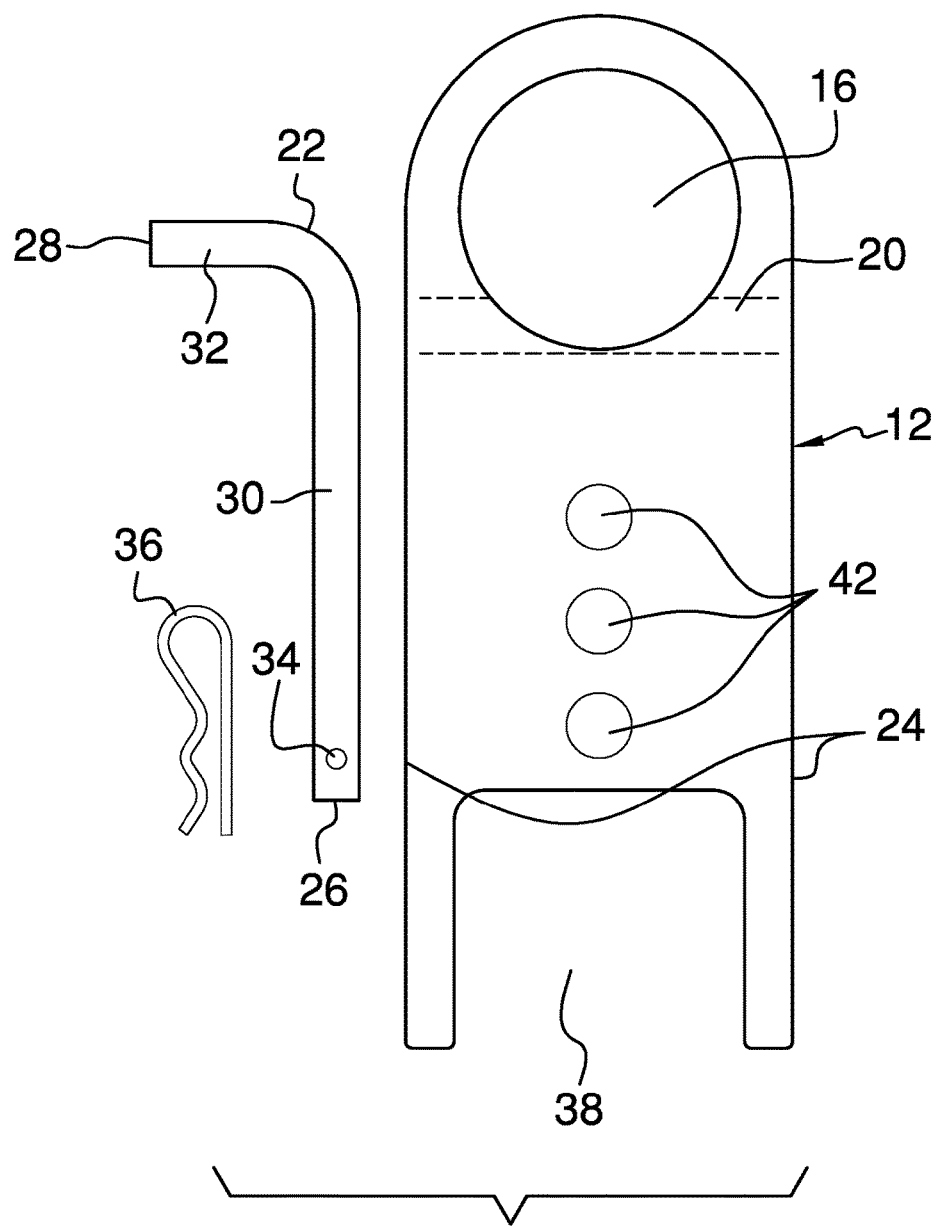
FIG. 3 is an exploded view of an embodiment of the disclosure.
Figure 4:
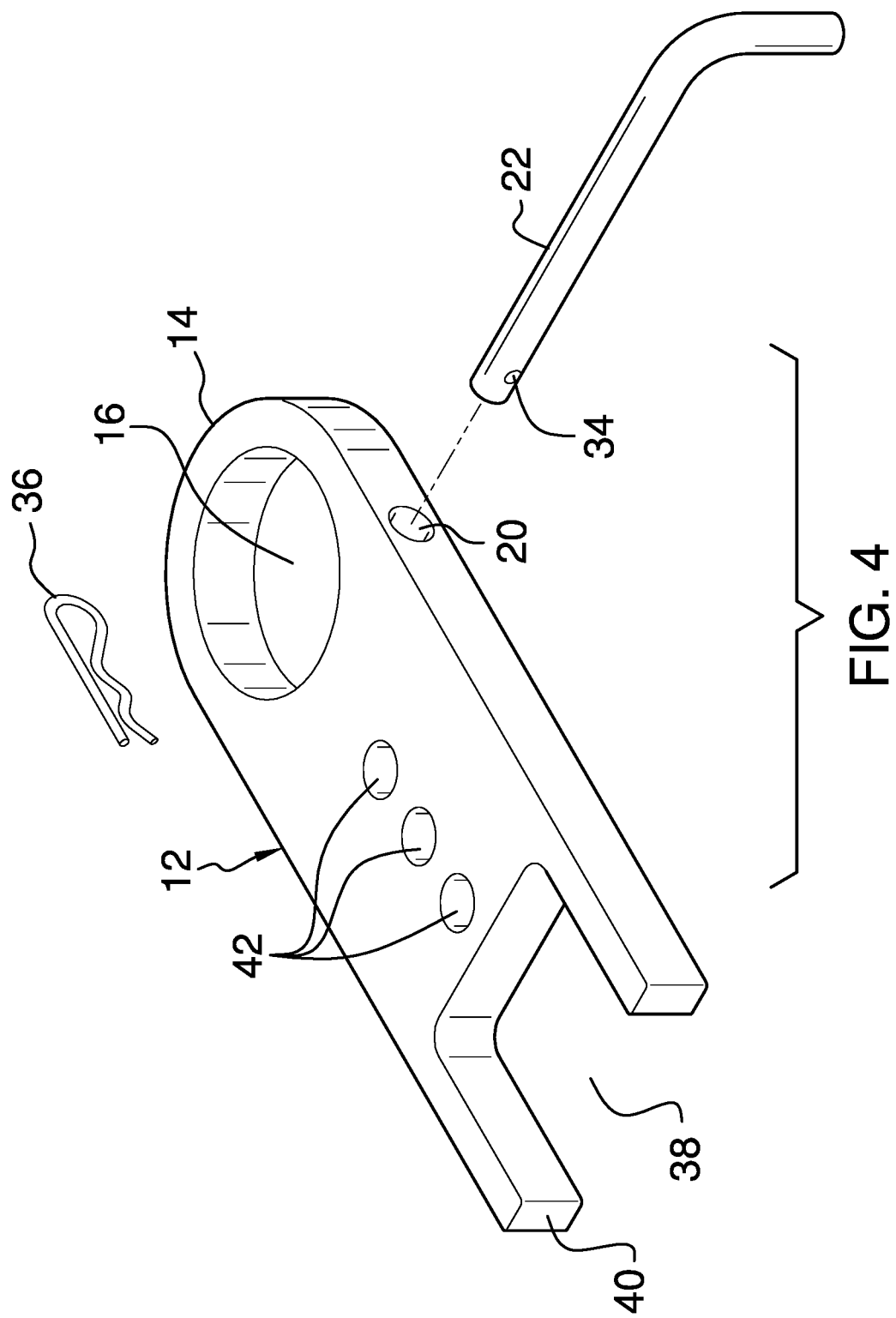
FIG. 4 is an exploded view of an embodiment of the disclosure.

With reference now to the drawings, and in particular to FIGS. 1 through 5 thereof, a new adaptor embodying the principles and concepts of an embodiment of the disclosure and generally designated by the reference numeral 10 will be described.

As best illustrated in FIGS. 1 through 5, the tow ball adaptor 10 generally comprises a plate 12 that is substantially rectangularly shaped. The plate 12 has a first end 14. In one embodiment, the first end 14 is arcuate. In another embodiment, the plate 12 comprises metal. In yet another embodiment, the plate 12 comprises steel.

A first hole 16 is positioned through the plate 12 proximate to the first end 14. The first hole 16 is complementary to a tow ball that is coupled to a vehicle, such as a tractor, all-terrain vehicle, and a lawn mower. The first hole 16 is configured to insert the tow ball to couple the plate 12 to the vehicle.

A coupler 18 is coupled to the plate 12 proximate to the first hole 16. The coupler 18 is configured to couple to the tow ball to retain the tow ball in the first hole 16. In one embodiment, the coupler 18 comprises a channel 20 and a rod 22. The channel 20 extends between opposing sides 24 of the plate 12. The rod 22 has a first terminus 26 and a second terminus 28. The rod 22 is bent proximate to the second terminus 28 to define a first segment 30 and a second segment 32 of the rod 22. The first segment 30 is substantially complementary to the channel 20. The channel 20 is positioned to insert the first segment 30 of the rod 22. The first terminus 26 protrudes from the plate 12. The first segment 30 protrudes into the first hole 16 so that the rod 22 is configured to couple to the tow ball to retain the tow ball in the first hole 16. In another embodiment, the channel 20 is circularly shaped when viewed longitudinally. In yet another embodiment, the rod 22 comprises metal. In still yet another embodiment, the rod 22 comprises steel.

A second hole 34 is positioned through the rod 22 proximate to the first terminus 26. The second hole 34 is positioned to insert a hairpin cotter 36 that is complementary to the second hole 34. The hairpin cotter 36 is coupled to the rod 22 to retain the rod 22 in the channel 20. In one embodiment, the hairpin cotter 36 comprises metal. In another embodiment, the hairpin cotter 36 comprises steel.

A cutout 38 extends into the plate 12 from a second end 40 of the plate 12. The cutout 38 is substantially complementary to an implement hitch. The cutout 38 is configured to insert the implement hitch. In one embodiment, the cutout 38 is substantially squarely shaped.

A plurality of third holes 42 is positioned through the plate 12. The plurality of third holes 42 extends linearly between the first hole 16 and the cutout 38. The third holes 42 are complementary to a pair of orifices that is positioned singly in upper and lower tongues of the implement hitch. Each third hole 42 is positioned to selectively align with the pair of orifices to insert a hitch pin to couple the implement hitch to the plate 12. The implement is coupled to the vehicle. In one embodiment, the plurality of third holes 42 comprises three third holes 42.

In use, the first hole 16 that is positioned through the plate 12 is configured to insert the tow ball to couple the plate 12 to the vehicle. The channel 20 that is positioned in the plate 12 is positioned to insert the first segment 30 of the rod 22. The first terminus 26 of the rod 22 protrudes from the plate 12 and the first segment 30 protrudes into the first hole 16. The rod 22 is configured to couple to the tow ball to retain the tow ball in the first hole 16. The second hole 34 that is positioned in the rod 22 is positioned to insert the hairpin cotter 36 to couple the hairpin cotter 36 to the rod 22 to retain the rod 22 in the channel 20. The cutout 38 that is positioned in the plate 12 is configured to insert the implement hitch. Each third hole 42 that is positioned in the plate 12 is positioned to selectively align with the pair of orifices. The hitch pin is inserted through the third hole 42 and the pair of orifices to couple the implement hitch to the plate 12. The implement is coupled to the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A tow ball adaptor comprising:
   a plate;
   a first hole positioned through said plate proximate to a first end of said plate, said first hole being complementary to a tow ball coupled to a vehicle;
   a coupler coupled to said plate proximate to said first hole, said coupler being configured for coupling to the tow ball;
   a cutout extending into said plate from a second end of said plate, said cutout being complementary to an implement hitch;
   a plurality of third holes positioned through said plate, said plurality of third holes extending linearly between said first hole and said cutout, said third holes being complementary to a pair of orifices positioned singly in upper and lower tongues of the implement hitch; and
   wherein said first hole is positioned through said plate such that said first hole is configured for inserting the tow ball for coupling said plate to the vehicle, wherein said coupler is positioned on said plate such that said coupler is configured for coupling to the tow ball for retaining the tow ball in said first hole, wherein said cutout is positioned in said plate such that said cutout is configured for inserting the implement hitch, wherein said third holes are positioned in said plate such that each said third hole is positioned for selectively aligning with the pair of orifices for inserting a hitch pin for coupling the implement hitch to the plate such that the implement is coupled to the vehicle.

2. The adaptor of claim 1, further including said first end being arcuate.

3. The adaptor of claim 1, further including said plate comprising metal.

4. The adaptor of claim 3, further including said plate comprising steel.

5. The adaptor of claim 1, further including said coupler comprising a channel and a rod, said channel extending between opposing sides of said plate, said rod having a first terminus and a second terminus, said rod being bent proximate to said second terminus defining a first segment and a second segment of said rod, said first segment being complementary to said channel, wherein said channel is positioned in said plate such that said channel is positioned for inserting said first segment of said rod such that said first terminus protrudes from said plate and such that said first segment protrudes into said first hole, wherein said rod is configured for coupling to the tow ball for retaining the tow ball in said first hole.

6. The adaptor of claim 5, further including said channel being circularly shaped when viewed longitudinally.

7. The adaptor of claim 5, further including said rod comprising metal.

8. The adaptor of claim 7, further including said rod comprising steel.

9. The adaptor of claim 7, further comprising:
   a second hole positioned through said rod proximate to said first terminus;
   a hairpin cotter, said hairpin cotter being complementary to said second hole; and
   wherein said second hole is positioned in said rod such that said second hole is positioned for inserting said hairpin cotter for coupling said hairpin cotter to said rod for retaining said rod in said channel.

10. The adaptor of claim 7, further including said hairpin cotter comprising metal.

11. The adaptor of claim 10, further including said hairpin cotter comprising steel.

12. The adaptor of claim 1, further including said cutout being squarely shaped.

13. The adaptor of claim 1, further including said plurality of third holes comprising three said third holes.

14. A tow ball adaptor comprising:

a plate, said plate having a first end, said first end being arcuate, said plate comprising steel;

a first hole positioned through said plate proximate to said first end, said first hole being complementary to a tow ball coupled to a vehicle, wherein said first hole is positioned through said plate such that said first hole is configured for inserting the tow ball for coupling said plate to the vehicle;

a coupler coupled to said plate proximate to said first hole, said coupler being configured for coupling to the tow ball, wherein said coupler is positioned on said plate such that said coupler is configured for coupling to the tow ball for retaining the tow ball in said first hole, said coupler comprising a channel and a rod, said channel extending between opposing sides of said plate, said channel being circularly shaped when viewed longitudinally, said rod having a first terminus and a second terminus, said rod being bent proximate to said second terminus defining a first segment and a second segment of said rod, said first segment being complementary to said channel, wherein said channel is positioned in said plate such that said channel is positioned for inserting said first segment of said rod such that said first terminus protrudes from said plate and such that said first segment protrudes into said first hole wherein said rod is configured for coupling to the tow ball for retaining the tow ball in said first hole, said rod comprising steel;

a second hole positioned through said rod proximate to said first terminus;

a hairpin cotter, said hairpin cotter being complementary to said second hole, wherein said second hole is positioned in said rod such that said second hole is positioned for inserting said hairpin cotter for coupling said hairpin cotter to said rod for retaining said rod in said channel, said hairpin cotter comprising steel;

a cutout extending into said plate from a second end of said plate, said cutout being complementary to an implement hitch, wherein said cutout is positioned in said plate such that said cutout is configured for inserting the implement hitch, said cutout being squarely shaped; and a plurality of third holes positioned through said plate, said plurality of third holes extending linearly between said first hole and said cutout, said third holes being complementary to a pair of orifices positioned singly in upper and lower tongues of the implement hitch, wherein said third holes are positioned in said plate such that each said third hole is positioned for selectively aligning with the pair of orifices for inserting a hitch pin for coupling the implement hitch to the plate such that the implement is coupled to the vehicle, said plurality of third holes comprising three said third holes.

* * * * *